United States Patent [19]

Beckinger et al.

[11] Patent Number: 4,694,452
[45] Date of Patent: Sep. 15, 1987

[54] SWITCHING CONFIGURATION FOR A TELECOMMUNICATIONS SYSTEM IN PARTICULAR A PBX SYSTEM WITH SUBSCRIBER LINES, TRUNK GROUPS, AND INTERFACE MODULES

[75] Inventors: Günther Beckinger, Unterpfaffenhofen; Gerhard Egler; Thomas Rambold, both of Munich, all of Fed. Rep. of Germany

[73] Assignee: Siemens Aktiengesellschaft, Berlin and Munich, Fed. Rep. of Germany

[21] Appl. No.: 865,922

[22] Filed: May 14, 1986

Related U.S. Application Data

[63] Continuation of Ser. No. 562,509, Dec. 16, 1983, abandoned.

[30] Foreign Application Priority Data

Dec. 22, 1982 [DE] Fed. Rep. of Germany ....... 3247598
Jan. 21, 1983 [DE] Fed. Rep. of Germany ..... 33011979
Jan. 21, 1983 [DE] Fed. Rep. of Germany ....... 3301996
Jan. 21, 1983 [DE] Fed. Rep. of Germany ....... 3301966
Jan. 28, 1983 [DE] Fed. Rep. of Germany ...... 3302920

[51] Int. Cl.$^4$ ............................................ H04Q 11/04
[52] U.S. Cl. .................................... 370/58; 370/110.1; 370/68.1; 379/230; 379/269
[58] Field of Search ...................... 370/58, 110.1, 68.1; 379/225, 230, 231, 234, 268, 269, 278

[56] References Cited

U.S. PATENT DOCUMENTS

| | | | |
|---|---|---|---|
| 4,191,857 | 3/1980 | McLaughlin et al. | 370/58 |
| 4,356,563 | 10/1982 | Viale | 370/58 |
| 4,504,942 | 3/1985 | Aro et al. | 370/58 |
| 4,513,414 | 4/1985 | Knapke et al. | 370/58 |

FOREIGN PATENT DOCUMENTS 3202971 9/1982 Fed. Rep. of Germany .

OTHER PUBLICATIONS

NEC Research & Development Report (NEAX 61 Digital Remote Switching System), pp. 86 to 93.
Telecom Report 2, (1979), vol. 3, pp. 174-813.
International Switching Symposium, Montreal Sep. 1-25, 1981, No. 1.
International Switching Symposium, Montreal Sep. 21-25, 1981, No. 2.
International Switching Symposium, Montreal Sep. 21-25, 1981, No. 3.

*Primary Examiner*—Douglas W. Olms
*Attorney, Agent, or Firm*—Adel A. Ahmed; Thomas H. Jackson

[57] ABSTRACT

In each case, a common interface module is assigned to subscriber lines and/or trunk groups. This interface module is connected both to the speech path switching network and, via a data transmission trunk group, to a central controller which establishes the switching paths. The information is transmitted via the speech path switching network using pulse code modulation. To provide central control for the telephone exchange, the information is transmitted via a data transmission trunk group using a message format with variable data length (HDLC procedure). Each interface module is assigned an interface circuit for transmitting information to and receiving information from the connected subscriber lines and/or trunk lines, for buffering speech and signal information, and for monitoring status. Speech and signal information are transmitted based upon the control commands of the central controller and based upon a peripheral controller assigned to the interface module. A transmitting and receiving unit assigned to this module makes it possible not only to transmit information via the data transmission trunk group to the central control, using a message format with variable data length, but also to convert this information into pulse frames, transmitted with pulse code modulation, which are appropriate for transmitting information via the speech path switching network. This fully integrable interface module should make it possible to transmit data in addition to speech information via the speech path switching network using a fully integrable interface module allocated to a group of subscriber stations and trunks.

6 Claims, 6 Drawing Figures

SWITCHING CONFIGURATION FOR A TELECOMMUNICATIONS SYSTEM IN PARTICULAR A PBX SYSTEM WITH SUBSCRIBER LINES, TRUNK GROUPS, AND INTERFACE MODULES

CROSS-REFERENCE

This is a continuation of Ser. No. 562,509 filed Dec. 16, 1983, now abandoned.

BACKGROUND OF THE INVENTION

The invention relates to a switching configuration for a telephone system, such as a PBX, with subscriber line and trunk groups, in which the respective groups and the combined subscriber line/trunk groups are each connected via a common interface module for each such group, both to the speech path switching network, and via a data transmission trunk group, to a central controller. The central controller is provided to establish the switching paths of incoming and outgoing subscriber lines and trunks. Information is transmitted via the speech path switching network using pulse code modulation and the information is transmitted via the data transmission trunk group using a message format with variable data length (HDLC procedure). In addition, an interface circuit is assigned to each interface module for the purpose of transmitting to or receiving from the subscriber lines and/or the trunks, and for buffering voice signal data, and for status monitoring.

In "Telcom Report 2" (1979), Vol. 3, pages 174–83, the architecture of a new line of digital public switching systems is disclosed. In these systems subscriber lines and trunk groups are connected to a speech path switching network via a respective common interface for each such group. The speech information is transmitted via the speech path switching network using pulse code modulation. The remaining information required for establishing the switching paths, which is to be transmitted to a group processor assigned to the group, is directly applied to this group processor via separate data transmission trunks. The other information required for establishing the switching paths and for processing in the central controller is exchanged between the interface modules and the central controller, or between the group processors and the central controller, via separate data trunks, and via a group switch and the common switching network. The speech information transmitted via the speech path switching network is transmitted using pulse code modulation. The information supplied via the individual data transmission trunk groups or the common signaling channels is transmitted using a message format with variable data length (HDLC procedure).

In "NEC Research and Development", No. 64, January 1982, pages 86–93 an NEAX 61 digital transmission system is disclosed. In this system information is exchanged between central controllers (RLOC and HDTIC) via individual transmission paths which also include, in part, speech transmission paths. The speech information is transmitted using pulse code modulation. The information to be transmitted between the central controllers is converted from the message format with a variable data length into pulse code information. It is then transmitted via the transmission path mentioned above in a specific pulse frame of a specific length.

However, the previously mentioned exchange of information between the central controllers does not take place via the interface modules, which operate on an analog basis in this system.

SUMMARY OF THE INVENTION

The object of this invention is to provide a simple design for an interface module for subscriber line and transmission trunk circuit groups, and for combined subscriber line/transmission trunk circuit groups which can be fully integrated, and via which both speech and signal information can be transmitted using a separate peripheral controller.

This is accomplished by transmitting speech and signal information, depending on control commands from the central controller and peripheral controller, which is allocated to the interface module and which is connected via an internal data transmission trunk group to the interface circuit, the speech path switching network, and the data transmission trunk group.

By using a separate peripheral controller which is connected via an internal data transmission trunk group to the interface circuit and to both the speech path switching network and to the data transmission trunk group, it is possible to interconnect the required devices so that integration is feasible.

In one embodiment of the invention a transmitting and receiving device, which is allocated to the data transmission trunk groups for receiving and transmitting data between the central controller and the peripheral controller using a message format with variable data length, is connected to the interface module. This transmitting and receiving device is also connected to the internal data transmission trunk group. This enables a more rapid exchange of data between the peripheral controller and the central controller.

In accordance with another embodiment of the invention, a memory is allocated to the interface module which is linked to the internal data transmission trunk, and is provided for the reception of information with a variable data length message format. This information is buffered in this memory and, depending on the peripheral controller, is applied to the transmitting and receiving device where, depending on the timer and control switching equipment allocated to the interface module, it is made available for pulse-code transmission via the speech path switching network or for the conversion of pulse-coded signals received via the speech path switching network.

Therefore, by means of the interface module which can be fully integrated, the data available in the variable data length message format can be easily transmitted both via the data transmission trunk group provided and via the available speech path following its conversion using pulse code modulation. It is therefore possible to transmit between any terminals the data which is specific to one terminal without requiring separate and expensive conversion units at the terminals.

Other features and advantages of the invention will be apparent from the following detailed description and from the claims.

For a full understanding of the present invention, reference should now be made to the following detailed description of the invention and to the accompanying drawings.

DETAILED DESCRIPTION

Figure 1:
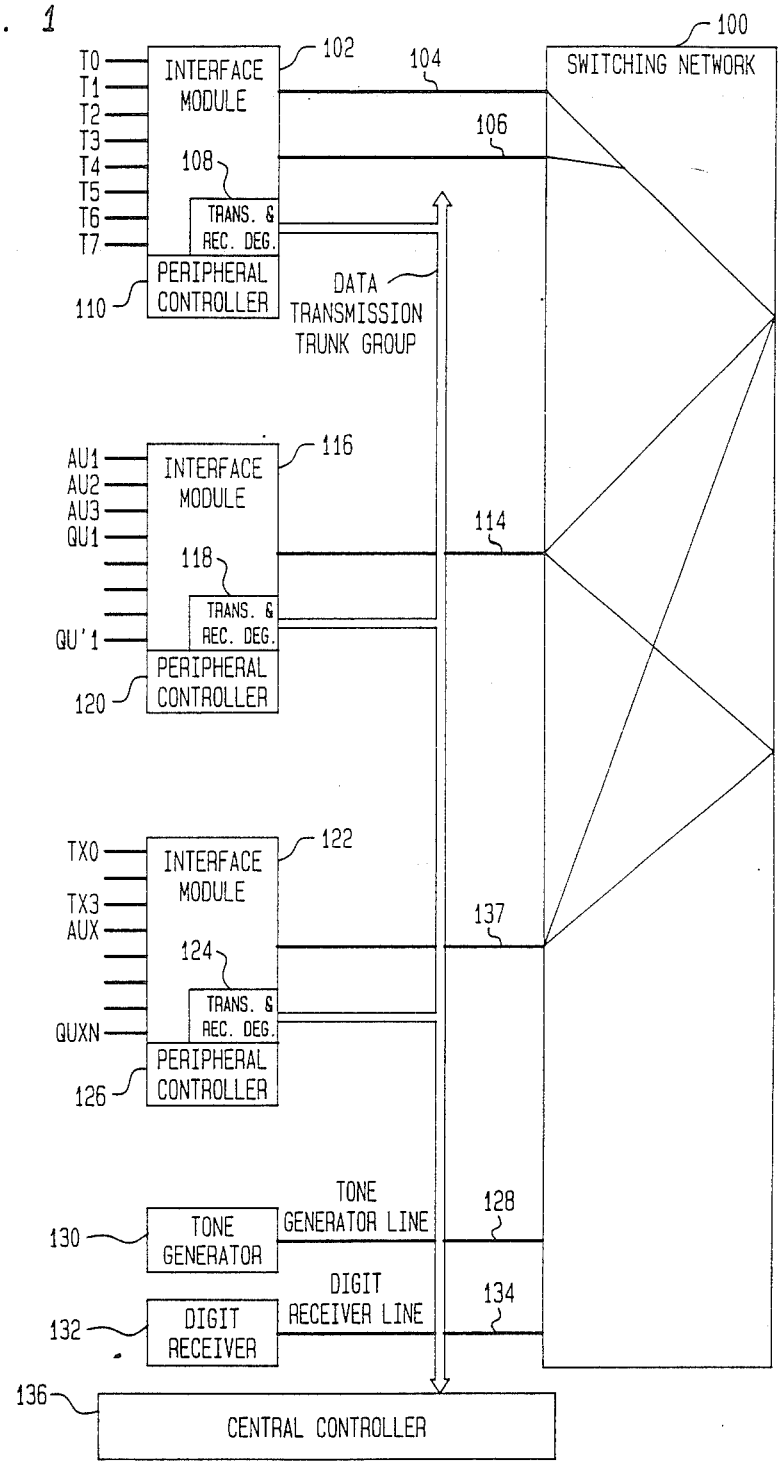
FIG. 1 shows diagrammatically a simplified representation of a digital PBX, based upon which the functions of call setup are explained.

Referring to FIG. 1 a digital PBX with three interface modules is shown. At interface module 102, for example, eight subscriber stations can be connected. It is also possible, by means of appropriate measures, to connect up to 16 subscriber stations. At interface module 116, for example, 8 different types of trunks, such as PBX trunk lines and tie lines, can be connected. At interface module 122, for example, three subscriber stations and four trunks can be connected. Each of the interface modules is connected to the speech path switching network 100 via the appropriate trunk group 106, 114, or 137, and to the central controller 136 of the PBX via the common data transmission trunk 112. Information appropriate to speech transmission and, as will be described, other data can be transmitted via each of the trunk groups using pulse code modulation. Also information is exchanged between connected subscriber stations via of the PBX, between connected trunk circuits, or between subscriber stations and trunk circuits via the speech path switching network 100. Additional devices (not shown) such as additional memory units, tone generators, MFC receivers, test interfaces, or data units, can be connected via the speech path switching network.

Basically, calls are set up in the following manner:

The interface module detects when a subscriber goes off-hook. Then, via the speech path switching network, the calling subscriber is connected to a tone generator, such as 130, and to a digit receiver 132. By means of the dialed digits the call request is reported to the central controller 136 which checks a code for completeness and also checks the class of service of the calling subscriber station of the incoming trunks. The central controller sets up the additional connection to the subscriber station to be called or to the trunk to be seized in the same way as it sets up the connection to the tone generator and the digit receiver. If necessary, information from the interface module is transmitted to another interface module via the data transmission trunk group DL based upon commands from the central controller 136. Also, data from one data module may be transferred to another data module via the speech path switching network, or transmitted via trunks. The last point is of greater importance since a simple data exchange without additional trunks is possible only via this path. The diagram shown assumes that conversion units (CODEC) are already allocated to the subscriber stations for converting analog data into digital data and vice versa.

Further adaptation of the functions takes place in the interface modules shown. Appropriate conversion circuits (CODEC) can be allocated to the interface circuit of the interface module for the conversion of analog signals of analog subscriber stations or analog trunks into digital data.

Speech information is transmitted to the speech path switching network 100 via the PCM interface circuit 212. For example, in the PCM 30 transmission system it is possible to transmit 30 calls simultaneously over two balanced wire pairs. For each of the 30 speech circuits, 8000 samples per second are transmitted in both directions in the form of 8-bit code words. Therefore, 30 code words with 8 bits each must be transmitted in succession in each direction within 125 microseconds. Associated with these 30 code words are an additional $2 \times 8$ bits; 8 bits for signaling and 8 bits that alternately contain a frame alignment word and a service word. The 30 cord words, together with the additional $2 \times 8$ bits, make up a pulse frame. The pulse frames are transmitted in direct succession. The frame alignment words of the pulse frames synchronize transmit and receive portions of the PCM 30 transmission systems. Bits 2 to 8 of the frame alignment word always have the same bit pattern. The receive portions determine the timing of the pulse frames based upon the incoming frame alignment words so that the incoming bits can be allocated to the individual speech circuits in the correct sequence. In the "zero" time slot the frame alignment word is transmitted alternately with the service word. The service word transmits signals for specific services. Call processing signals are transmitted via time slot 16.

Data is transmitted in a message format with variable data length using high-level signaling HDLC, via the data transmission trunk group DL leading to the central controller. The format of the data is converted into a bit stream of 64 bits/sec with high-level data transmission control. The length of the data format which can vary between 5 and 32 bytes, normally contains the address, serial number, test signal, and the actual message.

In new digital switching systems great importance is attached to the incorporation of new services, the expansion capability of the hardware and software, the decentralization of the logic, the high degree of reliability during simple maintenance, and the reduction of costs.

The new technical objectives are a substantially increased degree of flexiblity and programmability of the operating states prior to the processing of the peripheral events. Additional objects are a simple modular structure of the modules, reduced external wiring, and the availability of an efficient interface to both external device not associated with the system and to the central controller. This enables direct connection of digital subscriber modules in a fully digitalized network with a random integration of services. The interface module shown in FIG. 2 contains, as its most important component, an interface circuit SIU on which subscribers such as T1, and/or transmission trunks such as transmissions over trunk line AU1 or transmission over tie-line QU1, are conducted to the subscriber stations via trunks.

Otherwise, the data is exchanged on the interface module for transmissions over trunks and, if applicable, other peripheral components.

In the first half of a pulse frame data is transmitted from the interface module 200 to the respective peripheral component such as a subscriber station. In the second half of the frame, the data present in the peripheral component, such as in the subscriber station or trunk, is returned to the interface module. In the interface module, an 8 kHz signal is generated to synchronize the exchange of data. The data is always transmitted using a 512 kHz clock pulse which is independent of the clock pulse of the interface module.

Typically 64 Kbits of data is exchanged synchronously in both directions. Signaling data is transmitted in both directions in 8 bit frames. The test data is also transmitted in 1 byte frames in both directions. The data exchanged in each case is buffered in the interface component. For this purpose, appropriate buffers are provided for each transmission channel (transmit channel and receive channel) and separately for the signaling information, depending on the direction of transmission. This means that an A receive register buffers the data received in channel A. The same applies to the information transmitted in channel B and also to the signal information received. The same applies to the opposite transmission direction in which corresponding separate buffers are also assigned in each case. It must be noted here that the signaling byte coming from the peripheral component, such as a subscriber station, is stored in a memory for the current states of the peripheral components. In each case, the last preceding state detected is still available in an additional memory, and a comparator detects status changes at the subscriber station or in the connected trunk through comparison.

The status change is identified in the status memory mentioned last. Test data from memory 200 is passed on by the interface module without being buffered in the interface circuit. All processes via the interface circuit are initiated both by the central controller 136 and the peripheral controller assigned to the interface module 200. The LL logic 214 continuously checks the status of the memories which identify the status changes of the subscriber stations or of the trunks. Status memory of this type is allocated for each output to a peripheral component. If at least one bit changes in such an allocated memory, the assigned bit in status memory is set and this change is reported to the internal control devices 216 of the interface module via internal control signals. The interface circuit 212 links the interface module 200 to the speech path switching network 100. In the receive direction, this interface circuit causes the acceptance of the serial information via the programmed pulse edge. The series-parallel conversion of the incoming data and the storing of the information byte in an appropriate buffer also take place. In the transmit direction, the data undergoes a series-parallel conversion, the data is output with the programmed pulse edge, the test signals for accessing external buffer levels are generated, and the output stages are switched.

In addition, adapter memory 206 which controls the transfer of the received PCM information between the speech path switching network and the subscriber/trunk interfaces, is provided.

The storage capacity is 4×8 bytes and applies to the transmit direction for channel A with buffer CAM0, transmit direction B with buffer CAM1, the receive direction A with buffer CAM2, and receive direction B with buffer CAM3. Each of the peripheral components, such as subscribers, connected to an interface circuit is assigned a corresponding CAM line. Data transmission is identified by entering the time slot and the PCM channel in the address of the allocated subscriber in the corresponding CAM. Data transmission between the peripheral controller 110 (or 120, 126) and the transmission channels can be programmed in the respective adapter memory 206 buffer provided (for example CAM0). Each CAM buffer (for example CAM0) is completely read and evaluated in each time slot. The transfer of information in both directions is based on this readout and evaluation.

The timing equipment 204 generates all timing signals to be derived from a basic clock for the control of the PCM system. Clock pulse and transfer signals for the interfaces to the peripheral components and to the speech path switching network are also generated. The lines leading away to the external peripheral components EP indicate that the generated clock pulses are also to be used to control these components. In memory 215, the type of exchange of information with variable data length and the manner in which memory 224 is used are determined.

The internal data transmission line PBC-B links all function portions of the PCM synchronous block of interface module 200. The interfaces to the asynchronous block are formed by storage areas 220, 224 and the conversion unit 225.

This internal data transmission trunk group 211 is accessed by indirectly addressing interface circuit 230 of the peripheral controller. The internal data transmission trunk group operates in the time-division multiplex mode. In one half of the time slot, the synchronous traffic (for example, the PCM information) is transmitted, and in the other half of the time slot the asynchronous traffic (for example, the asynchronous information) is transmitted. This allows an optimum amount of data to be transmitted internally without access being affected by the process interfaces.

The data transmitted to the central controller via the data transmission trunk group 112 is associated with the "asynchronous" portion. Information is transmitted in a message format with variable data length (HDLC procedure) via this data trunk. The corresponding transmitting and receiving device 108 (or 118, 124) is used for the exchange of signaling and control information in the appropriate message format via an appropriate serial interface. The receiving device has the following tasks: Detection of the label code; detection of an individual address; a reset function; series/parallel conversion; storing appropriate commands in a receive-control signal storage unit RHBC; storing the user command in the receive-control signal storage unit RPCR; buffering of additional data bytes in receive-control memory RHR; redundancy check; frame test; and a switchover between the PCM transmission paths 0 and 1 during normal channel operation.

The transmit unit has the following tasks: Automatic control of the transmission process; reset function; parallel/series conversion; automatic request for information from the various internal information sources; transmission of the contents of the transfer command register of the appropriate transmitting device if the transmit process has been initiated by the internal controller; transmission of the contents of the transfer command register XPCR as a user instruction; attachment of a block check signal CRC at the end of the information frame; and transmission via selected PCM transmission paths 0 or 1 during normal channel operation.

The memories 227 of the internal controller control the logic level of the procedure for the transmission of information with variable data length (HDLC procedure). The processes in the components, which are from the user instruction and which follow internal states, are also controlled by the storage areas mentioned above. The above-mentioned processes are used primarily for the distribution of the received data blocks and the assembly of data blocks to be transmitted to the central controller. The following functions are to be performed in the transmit and receive directions: The user instructions are to be evaluated; the requested information source must be linked to the transfer buffer storage; incoming data in the receive buffer storage must be passed on to the information sink; the transmit and acknowledgment signals must be generated or evaluated; the functions of a controller with many outputs for the transmission must be executed; the data is to be transferred to the peripheral controller; and data is to be transferred to the synchronous portion of the transmitting and receiving device by exchanging control signals.

In addition, the commands of the transmit and receive unit must be evaluated at the logical level. Also, the transmit procedure must be started and the response package, including the information byte containing the user response must be assembled.

Accessing and buffering for the information to be transmitted to the peripheral controller via the corresponding data transmission line 229, are determined in the interface circuit 230. The control logic for this data transmission trunk group MD uses the signals from the data transmission line of the peripheral controller in order to access the internal function blocks. These function blocks are released by the CS signal normally derived from an address code. By means of an active WR signal, the peripheral controller transfers information to the interface module, while the information can be called up using the signal RD.

The memories 227 of the peripheral controller can be directly accessed. By programming the control-signal storage unit, a portion of the functional response of the interface module is determined. By means of status memories, information is reported back to the peripheral controller 110 (or 120, 126, 408, 414, 424, 510, 520, 528, 610, 620, 626, or 632). The address memory is used to buffer address information. The memories mentioned above are designated 226 and 228.

By transferring instructions into the MPC register of memory 226, the controller functions are controlled for the exchange of information between internal control and the control and receive elements 108 (or 118, 404, 508, 608). By setting individual bits in the MPC register mentioned above, the functions of the control devices SM are introduced. The initiated control processes can be interrupted by resetting the software.

Register portion TRC of memory 226 is used to connect the 64 kbit channels to interface circuit 230 of the internal controller. In memory 232, a code representing the cause of the interruption of the internal controller is stored in status register 1 (status 1). An appropriately set bit controls the interruption of the internal controller. By reading this status register (status 1), the status bits are individually reset depending on the information transferred to the internal controller. By means of the second status register (status 2) of memory 228, individual bits of status register 1 (status 1) can be masked. In status register 2 (status 2), information is stored which can be fetched by internal control if required, without interrupting the request. The corresponding contents are affected by the states of the interface circuit 225 between the internal data transmission trunk group 211 and the data transmission trunk group for central controller information, the provided transmit devices, and the transmit memory 224. The register portion EDR of memory 228 contains the causes of errors and is used to define in greater detail the bit set in status register 1 (status 1) for error identification. After register EDR has been read, all bits are reset. Information read out of register TAR of memory 228 is used to connect 64 kbits channels between interface circuit MI for internal control and the subscriber/connector circuit interfaces or the speech path switching network.

Register ABR of memory 226 is used to receive indirect addresses, while register ADR of memory 228 is used to receive the specific address assigned to the interface module.

The transmit memory 224 is a 16-byte flip-flop memory and is used during normal operation to buffer information blocks which must be made available to internal control and which are called by internal control via the transmit and receive device 218 of the data transmission trunk group 106. This type of information can be designated "direct information" and is transmitted via data transmission trunk group DL in a message format with variable data length (HDLC procedure). Depending upon the setting of the status register 215, this information is either written in by the status logic (LL logic) 214 via the internal data transmission trunk group 211 or is made available to the interface module by internal control as an information block using direct addressing. If, based upon the program of internal control, 64 kBaud channels are connected between the speech path switching network and the interface circuit of internal control, the transmit memory 224 is used to buffer the accumulating program interrupt addresses before they are passed on via the transmit address register TAR of memory 228 of internal control 110 (or e.g. 228, 408, 510, or 610). In this case, the transmit storage area FXP is not available for buffering transmit data.

In the two-way memory FSP for control data, up to 16 data bytes can be buffered. This memory 220 is addressed directly and is used for the exchange of information between the central controller, via the transmit and receive device 108 (or e.g. 404, 508, or 608), and the internal control, via the data transmission trunk group, or with the devices connected to the internal data transmission trunk group 211.

| Receiver/Transmitter | 224 | 220 | 202 | 204 |
|---|---|---|---|---|
| HDP |  |  | X |  |
| FSP |  |  | X | X |
| SIU | X | X |  |  |
| CAM |  | X |  |  |

It is possible to exchange information via the two-way memory 220 for the control information. Control of this memory is assumed by the control device MSP assigned to internal control. Control information is transferred from memory 220 by means of the status register (status 1) using an interrupt command, an instruction of register MPC, a command or return criterion of central control, or using internal control signals of interface module 200. Interface circuit 230 of internal control 110 controls the transmission of information asynchronous to the PCM time slot pattern via the internal data transmission trunk group PBC-B and, in the process, performs the following tasks: Evaluation of the interface module information affecting user commands; and the distribution of the interface module information buffered in two-way memory 220. Additional tasks are storing the internal information requested for each interface module command in the two-way memory 220; controlling data transmission in the case of indirect addressing; controlling the status logic (LL logic); storing the signaling information in transmit memory 224; receiving the signaling information without buffering; and coordinating the individual types of transmission (PCM and HDLC procedure) by means of a priority logic.

An asynchronous exchange of information between the following device is possible:

| Receiver/Transmitter | 224 | 220 | 202 | 204 |
|---|---|---|---|---|
| HDP | | | X | |
| FSP | | | X | X |
| SIU | X | X | | |
| CAM | | X | | |

The interface circuit 225 between the internal data transmission trunk group 211 and the data transmission trunk group 229 of internal control, serves as an interface information buffer with indirect addressing. However, this buffer is accessed by the interface of internal control via direct addressing. The exchange of information between this interface information buffer 225 and a memory in which the destinations or the origins are stored is initiated and controlled by the control switching equipment 216.

The functional response of the interface module SB is determined, on the one hand, by the initialization and static setting and, on the other hand, by the transfer of parameter addresses and control commands which are transferred by internal control itself. Alternately, these addresses and commands can be transferred by the internal control via the serial interface for the information using the message format with variable data length. For data bend accepted via the data transmission trunk group, the interface module address, the type of interface module, and the type of control must be identified. In addition, the characteristics of the transmitting and receiving device 108 (or e.g. 404, 508, or 608), such as the divider ratio of the information clock pulse and the interface connection, must be indentified. The appropriate predefined values are transmitted via the interface of internal control before the interface module is started up. If internal control is connected, settings are made by transferring the appropriate information on the part of internal control. Prior to startup, a series of statements in the registers must still be received. These statements are used for static settings and normally do not change during operation. Included in the statements, for example, is the designation of the PCM system type, the designation of the strobe timing for signaling, the designation of the type and period of LL logic status processing, and the designation of the timer control clock pulse of the PCM speech path interfaces. Also included in the statements is the designation of the control of the 16×64 kbit channels between the subscriber and the speech path switching network. These are stored in the adapter memory 206.

By means of the settings mentioned above, the interface module is able to control the speech, information, and signaling paths. In addition, the required parameter commands and control commands are supplied to the interface module from the central controller in the form of user commands. In order to expand functions, it is possible to connect an additional controller in the form of a microcomputer to the parallel interface EP. The internal control which is also designed as a microcomputer, has the possibility of controlling the interface module via registers which can be addressed directly, or of interrogating states and thus initiating or affecting the following internal sequences: The interrupt-controlled access to status data (LL logic); the interrupt-controlled access to 64 kbit channels on the speech path side and the subscriber side; the exchange of data blocks between the interface module and the central controller; and the expansion of the logicl level of the data exchange in the message format with variable data length (HDLC procedure).

From the preceding discussion, is it clear that the described interface module 102 (or e.g. 402, 508, or 602) is a module to which a group of 8 or 16 subscribers, trunks, or a combination of subscribers and trunks, is assigned. Depending upon the size of the system, an appropriate multiple of such interface modules is present. As shown in FIG. 1, these interface modules are linked to a speech path switching network SN either via group switches, in the case of larger systems, or directly, in the case of smaller systems. Thus, the interface module SB mentioned above is allocated collectively to a group of subscribers and/or trunks, and is connected to the speech path switching network via the appropriate lines for the transmission of speech information and other data via PCM, as well as to a data transmission trunk group 112 which leads to the central controller. The information transmitted via the data transmission trunk group 112 already mentioned, is transmitted in a message format with variable data length (HDLC procedure). The length of the message format can vary between 5 and 32 bytes and contains addresses, serial numbers, test signals, and the actual message. An interface circuit SIU is assigned to each interface module 102. This circuit is provided for the purpose of transmitting to or receiving from subscriber lines, such as T1, and/or transmission trunks, trunk line transmission AU1 and tie-line transmission QU1, for the purpose of buffering this speech and signaling information. Additionally, if applicable, this circuit converts analog information into digital form and vice versa. The circuit can also be used for monitoring the status of the connected subscriber terminals and the trunks. This monitoring is executed in conjunction with the status logic (LL logic) provided. Therefore, it is necessary to exchange information via the internal data transmission trunk group 211. The transmission of information to the subscriber terminals and to the trunks, as well as to the status logic, is dependent on the control commands of the central controller 136 (or e.g. 436, 536, or 636), and on a peripheral controller 110 assigned to the interface module 102 and connected via the internal data transmission trunk group 211 and via the data transmission trunk group 229 also assigned. As a rule, the peripheral controller consists of a commercially available micro-computer, such as an Intel 8080. The peripheral controller is connected to the assigned data transmission trunk group 259 of internal control 110 via the assigned interface circuits 230 and the appropriate driver circuit 232.

The preceding information also shows that timer and control switching equipment 204 and 216 for transmitting and receiving speech information in pulse coded from to the speech path switching network, or from the speech path switching network via the PCM interface circuit 212 are assigned to the interface module 200. This equipment is also connected to the internal data transmission trunk group 211.

A transmitting and receiving device HDP assigned to the data transmission trunk group HDP and which is used for receiving and transmitting information between the central controller and the peripheral controller 110 using a message format with variable data length (HDLC procedure) is assigned to the interface module 200. This unit is also connected to the internal data transmission trunk group 211. However, this transmitting and receiving device is also linked to the previously described two-way memory 220 for control data in which information is bufferred and is assigned to the transmit and receive device depending on the peripheral controller. It is then made available, depending on the timer and control switching equipment 204 and 216 assigned to interface module 102, for pulse-coded transmission via the speech path switching network and for the conversion of signals received via the speech path switching network in pulse-coded form. The data transmitted in pulse-coded form which is transmitted or received via the speech path switching network, is linked to a peripheral device, such as the internal data transmission trunk group or via an interface circuit 202. The data transmitted via the speech path switching network is processed in this peripheral device and, if applicable, is sent to a processor or to an evaluator. As an example, this data can be line data affecting statements concerning interference, tests, fire and other things which can be monitored.

The information mentioned above is exchanged in two freely programmable time slots via one of the two PCM transmission paths A and B during normal channel operation over the channels operating in the PCM mode.

In such a case, the information on the interfaces leading to the data transmission trunk group 112 becomes invalid. A prerequisite for transmitting the information via the speech paths is the availability of internal control (micro-processor) which, together with timing and control switching equipment 204 and 216, oversees the selection of the PCM channel to be allocated. In coordination with the control equipment 216 and with the channel buffer present in the timing equipment 204, an idle code is detected in the programmed time slot via memory 215. If this is the case, the transmitting and receiving device 108 (or 118, 218, 404, or 608) is programmed for the corresponding seizure of the selected PCM channel. The seizure remains in effect until it is released. The seizure of an idle channel by the transmitting and receiving device 108 is initiated by the internal peripheral controller 110. IN order to seize an idle channel, any two time slots must be entered in channel buffers CHR1 and CHR2 by means of indirect addressing. If this has occurred, the PCM interface 212 recognizes the information as information that must be processed as variable data via the transmitting and receiving device 404. Accordingly, the information is transmitted with variable data lengths in specific time slots of specific lengths in the selected channel and in consecutive frames. The maximum data transmission speed in each direction is $2 \times 64$ kbits/second.

A mode of operation which has one receive and one transmit time slot can be selected in place of the programmable time slot. In this mode of operation, the value entered in one of the channel buffers, such as CHR1, is interpreted as a receive time slot and the value entered in the other channel buffer CHR2 is interpreted as a transmit time slot. Only the incoming information in the receive time slot on the selected PCM channel is switched through to the internal transmitting and receiving device 404, and only in the transmit time slot is the corresponding information coming from the transmitting and receiving device HDP output. In this case, the maximum data transmission speed in each direction is $1 \times 64$ kbits/second.

Figure 3:
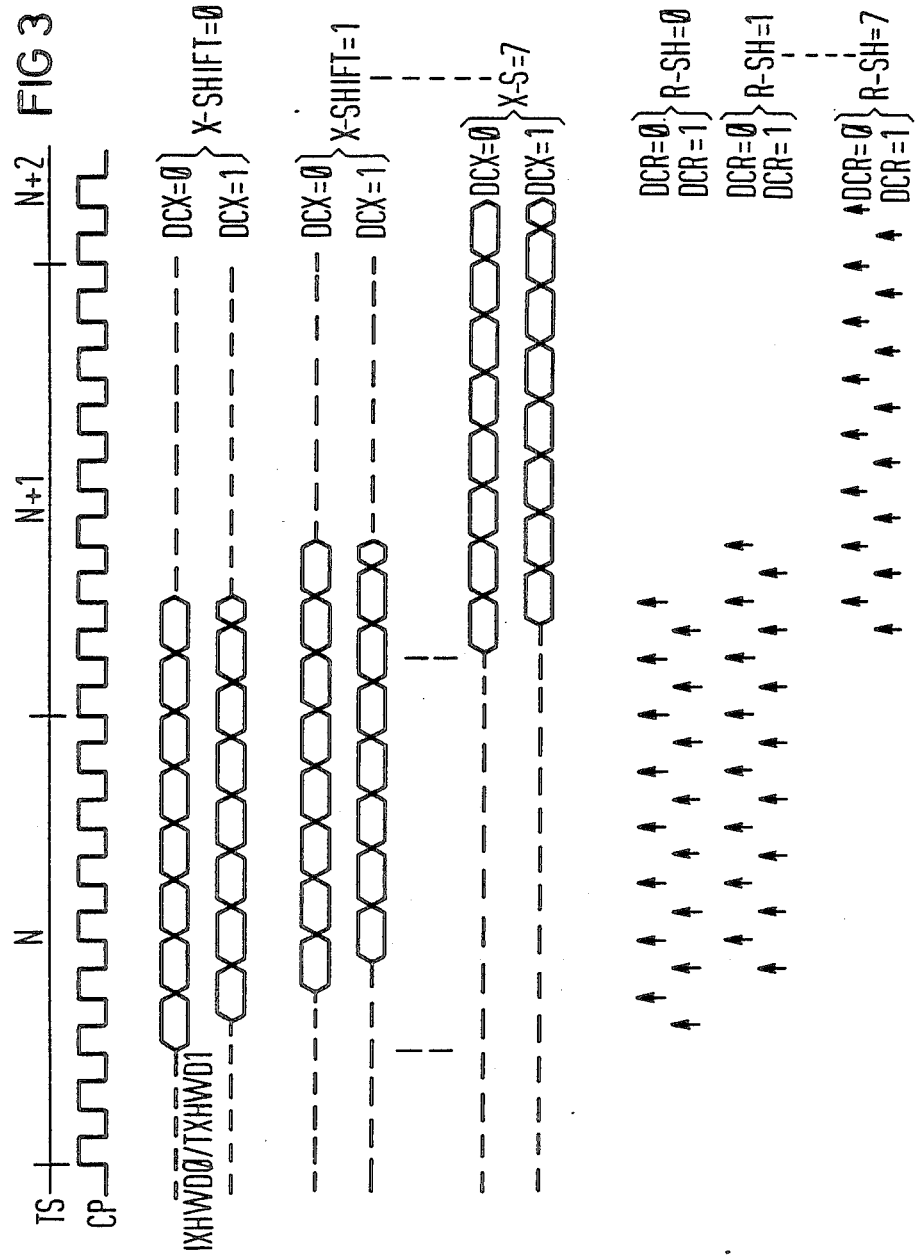
FIG. 3 illustrates pulse diagrams and signal combinations used for the exchange of information in the interface module shown in FIG. 2.

If the channel operation is programmed in time slot N, the timing of the transmitted and received data stream and of the transfer pulse edge can be set based upon the binary code of the avaiable bits X-SHIFT and R-SHIFT. In connection with this, reference is made to FIG. 3.

The interface module 200 is designed as a local control which is controlled by the higher-level control 408. All functions are executed in coordination with this internal control 408 (microcomputer) which, on the one hand, assumes the tasks of the peripheral pre-processing of information and, on the other hand, is used to expand the sequence of operations to a complete information package for the transmitting and receiving device 108. Information is transmitted via the previously mentioned data transmission lines 229 and 211. Only unrecognized commands are transferred for processing to the central controller of the telephone system, such as a PBX system.

The standard frame of a message format with variable data length consists of a start flag, and 8-bit address field, and 8-bit control field, an information field, a 16-bit CRC field, and an end flag. The leading bit is the least significant bit with the exception of the CRC field, in which the leading bit is the highest order bit. The transmit and receive unit is only addressed via the receive path when the address field contains either its own address entered in register ADR or the special call address (OOH), and if there are at least $4 \times 8$ bit words in the S and U frames between the start and end flags. In addition, the I frames must contain at least $5 \times 8$ bit-words between the start and end flags, and there must be no CRC errors. I, S, and U frames are provided to control the transmission path over the data transmission trunk group 106 (or e.g. 432 or e.g. 506). The S and U frames contain control information and the I frames contain useful data. From this available spectrum of commands, the interface module can decode and transmit commands without interrupting the central controller.

If it is assumed that information concerning the transmitting and receiving device 108 (or 404) must be sent to a PCM channel of the speech path conducted over the speech path switching network, appropriate preparation signals are generated in order to prepare for the seizure of an idle channel. As a response to these commands, the data within the interface module is stored in the two-way memory 220 and it made available for transmission. Each of the information fields of these commands contains a byte with the operations code and the originated address. In order to prepare for the seizure of channel B, for example, the time slot allocation is checked and the memories CAM1 (receive) and CAM3 (transmit) of the adapter memory 206 are read for the subscriber seizing the B channel. This information is received in memory 220. The setting of the internal memory and register is then checked. The content of the special storage area addresses by the adapter memory is received in the two-way memory 200. The length of the stored information is one byte. A signaling memory is checked using a preparation signal and the incoming signal byte of the subscriber seizing the channel is also stored in the two-way memory 220 by means of a command specifically for this purpose. In addition, the time slot assignment is checked, by reading the contents of memories CAM1 (receive) and CAM2 (transmit) for the call set up by the designated subscriber seizing the A channel and received in the two-way memory 220. The information received contains a command and an information field consisting of 1 to 16 bytes which are stored in memory FSP. By means of an appropriate command from internal control, a sequence of operations is initiated in which the data from the two-way memory 220 is transmitted to the actual destination. When the peripheral command preparation control data is received, the control data is again read out of the peripheral components. Depending on the check word, a defined amount of the setting data returned by the peripheral component is bufferred in memory 220. Following the completion of this process, the echoed check word is located in memory 220 and, depending upon this check word, in an additional two, six, ten or fourteen data byte. The status logic (LL logic) must be reset to an initial value that can be selected. The available memories pack the bytes for all internal memories and registers, which are specified for one or more of these memories or registers, in one message. These bytes are distributed to the appropriate special registers. When setting up a call for an A-channel subscriber, the length of the data field can vary between 2 and 14 bytes. The first data byte is written into the designated address of memory CAM1 (receive), and the second byte is written into memory CAM2 of the adapter memory 206. Additional bytes are transmitted to the peripheral component as setting data; one byte per frame. When a rapid connection is set up for a B-channel subscriber, the length of the data field can also be variable.

Figure 2:
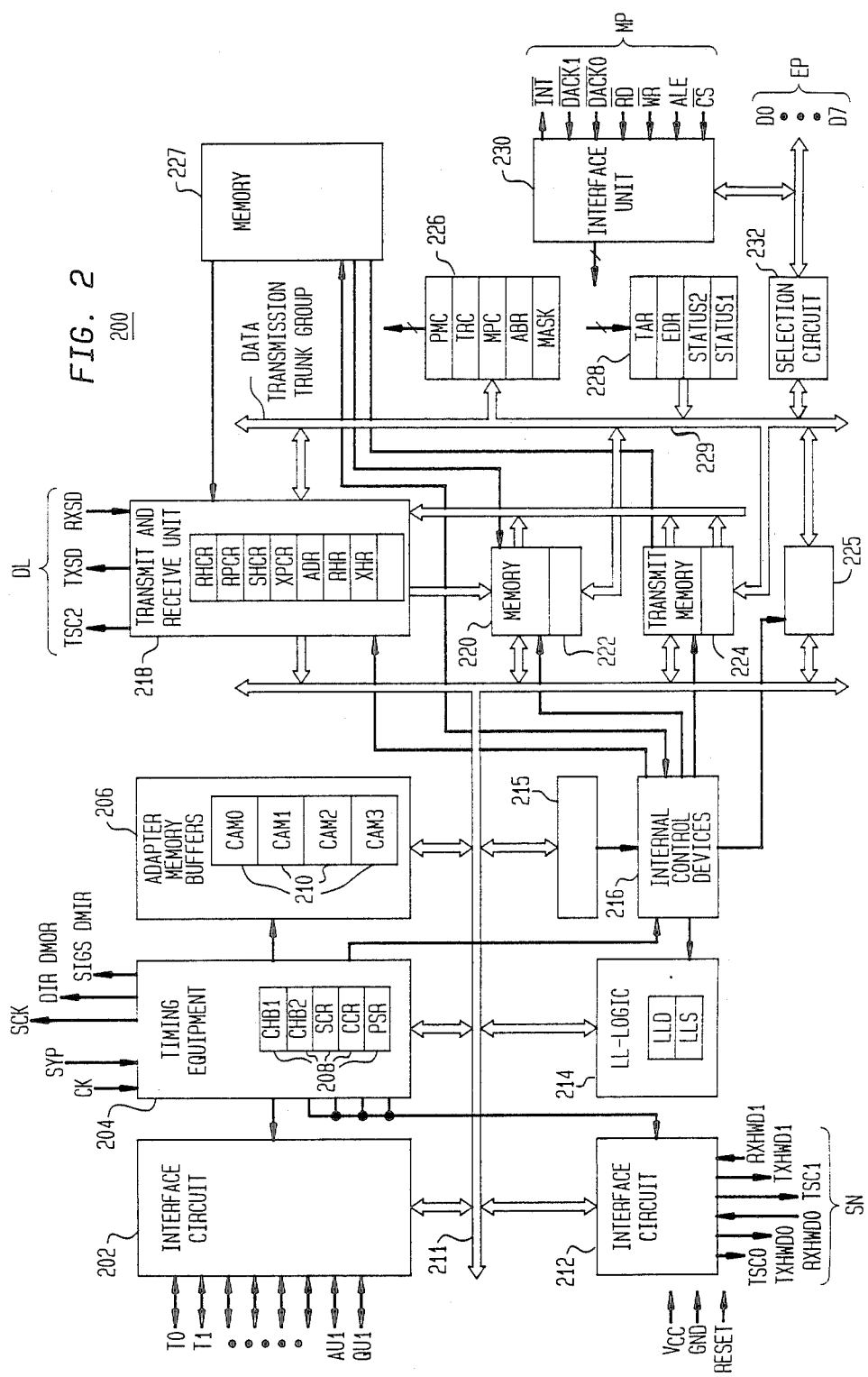
FIG. 2 shows diagrammatically details of the interface module.
Figure 4:
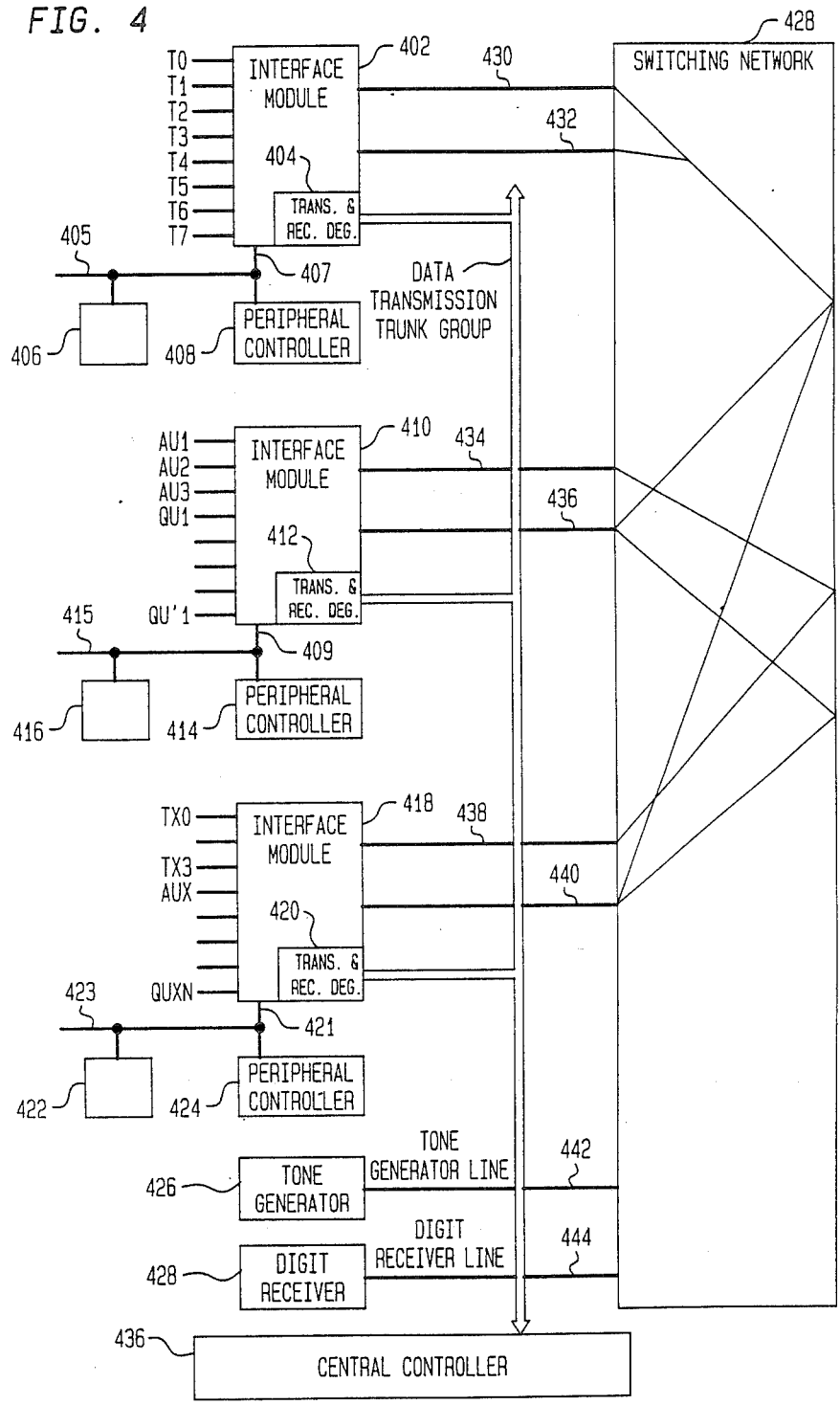
FIG. 4 shows diagrammatically a simplified representation of a digital PBX, based upon which the functions of call setup are explained, and in which additional data terminals can be connected to an additional data transmission trunk.

As illustrated in FIGS. 2 and 4 and as previously described, the transmitting and receiving device 218 (or e.g. 404) of interface component SB is also used by each of the possible data terminals that can be connected to the additional data transmission trunk group DDL, for example, 406 for the conversion of any information to be transmitted in the transmit or receive direction. For this purpose, the transmitting and receiving device functions in conjunction with the memories, timing equipment, and control equipment 204 and 216 which are used in the manner described above. The additional data transmission trunk group 405 (or e.g. 415, 423, 507, 521, or 527) can be connected to the internal data transmission trunk group 211 via the data transmission trunk group 229 as shown in FIG. 4, via which the peripheral controller 408 is linked to the internal data transmission trunk group PBC-B by the interfacing circuitry of the selection circuit 232 and the interface information memory BIR. This connection is made via an additional selection circuit MDC. However, this selection circuit MDC can be connected directly, or via an appropriate buffer (comparable to 225), to the internal transmission trunk group. Therefore, a data terminal connected in this manner can then transmit data to and receive data from a distant terminal with the assistance of the available transmitting and reciving device 218 (or e.g. 404) of interface module 200 via the speech path switching network. As a result, additional conversion units are not required either in the interface module or in the data terminal.

As an example, it should again be mentioned that, in each case, the data terminal can be connected, for example, for receiving data blocks, both in the case of an incoming call on an interface module, such as 102 (or e.g. 402) or from another exchange via a trunk and via the local or interface module 116 (or e.g. 410). In the case of switching via the speech path switching network 100 with the assistance of the peripheral and/or central controller, such as 110 (or e.g. 408) and/or 136 with appropriate identification in the incoming data block, the data terminal can be connected. A data terminal such as 406, is then used for reproducing and printing out data, and as a buffer for any transmissions to an address designated in the data block, such as to a subscriber line for the purpose of reproducing data there, or to a video display terminal for display, etc. In this manner a data terminal of the local or other interface module can be temporarily assigned to each terminal of the exchange.

Figure 5:
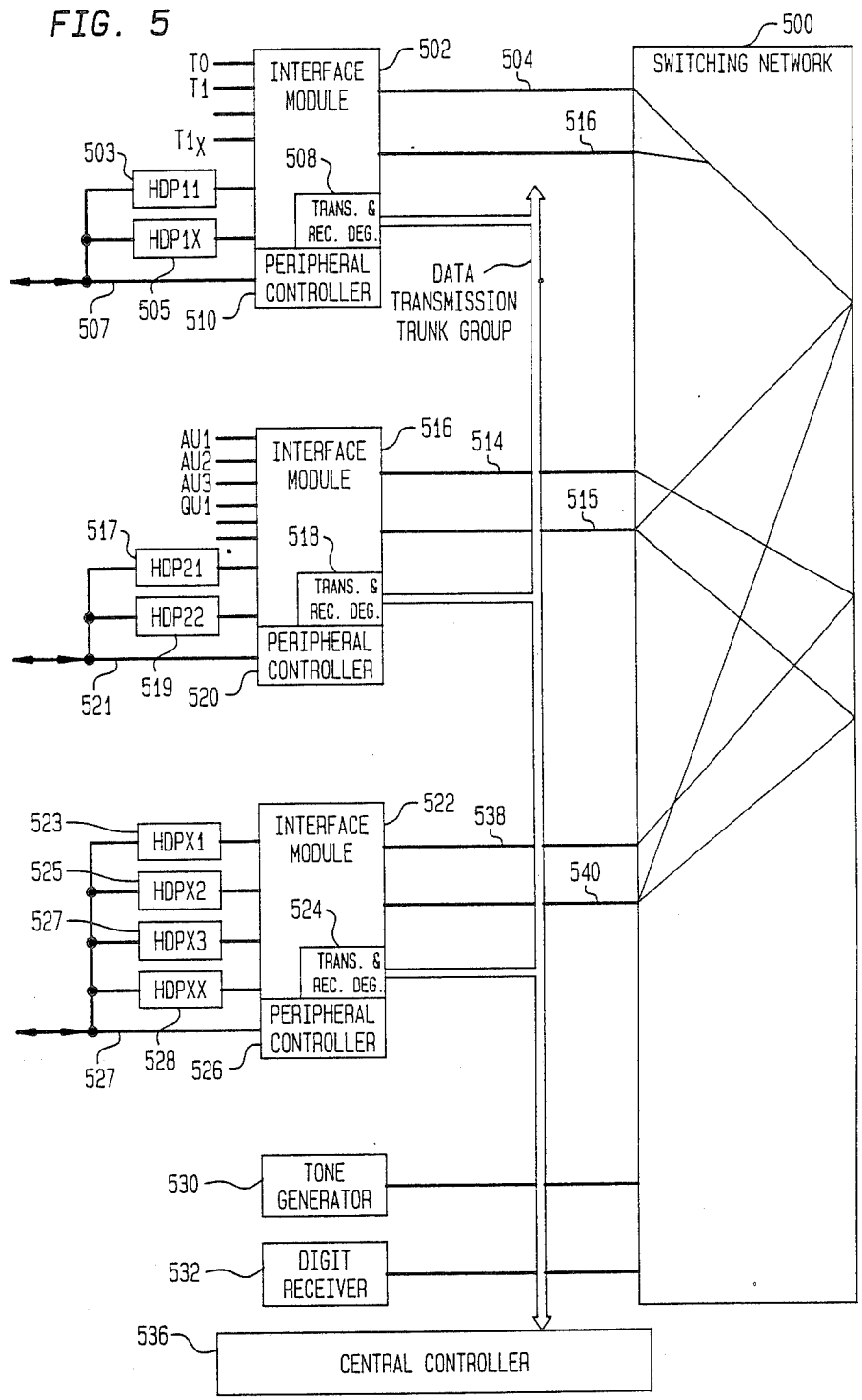
FIG. 5 shows diagrammatically a simplified representation of a digital PBX, based upon which the functions of call setup are explained, and which includes transmitting and receiving devices via which any data can be supplied to the speech path network.

As shown in FIGS. 2 and 5 and as described in the preceding pages, one or more transmitting and receiving devices such as subscriber lines and/or trunks are connected. The number of these devices is dependent on the tasks to be performed. Therefore, additional data can be sent via such a transmitting and receiving device, such as 218 (or e.g. 508), to a subscriber station over a parallel transmission path of the speech path switching network 500 in order to set the data terminals for example. The setting can result in either signal control or any visual reproduction. Several transmitting and receiving devices are required when the data set to the transmitted exceeds the maximum possible data block of 64 kbytes, or if such data must be transmitted for several subscriber stations or several trunks.

The exchange of information and the conversion of any data into PCM information and vice versa is controlled via the additional data transmission trunk group 507 and the selection circuit, as well as via the data transmission trunk group MD of the peripheral controller MP.

The transmitting and receiving device, such 503 is connected to the corresponding terminals (in a manner not shown) in order to reproduce or input information.

The function and control of transmitting and receiving device 503, which is connected to interface module SB like the subscriber stations and trunks, is the same as the function and control of transmitting and receiving device 508 of interface module 502. In addition, it sould be mentioned that the transmitting and receiving device is connected in every case; for example, for receiving and/or transmitting data blocks, both in the case of calls arriving at an interface module, such as 502, and in the case of calls on an interface module, such as 522, exclusively linked with transmitting and receiving devices which arrive from another exchange via a trunk and via the local or another interface module, such as 516, and via connection over the speech path switching network 500 with the assistance of the peripheral and/or the central controller, 510 and/or 536, with appropriate identification in the incoming data block.

As soon as the peripheral or central controller has detected that data blocks are arriving and that a transmitting and receiving device must be disconnected (such as 525 from interface module 522), the destination address (for example, for subscriber line To) is determined on the interface module 502. An additional transmitting and receiving unit (such as 525 2) of the interface module SBx is now reserved and is switched through over the speech path switching network to subscriber line To, via interface module 502, in order to pass on the data in the appropriate converted form.

Therefore, the transmit and receive unit is used to reproduce data, as a buffer for data blocks received or to be transmitted, and also for the required conversions regardless of the module with wwhich it is associated. Over a single established speech path in an interface module, such as 522, data blocks can be transmitted simultaneously for three different destinations since these three destinations, at intital seizure of the transmitting and receiving device 525, are used by three additional transmitting and receiving devices to connect the other destinations. The data blocks arrive in sequence and are conducted only to the data terminal addresses in the data block. Thus, it is also possible to communicate with a central data center.

Furthermore, each of the several transmitting and receiving devices connected to one interface module (522) or to different interface modules (502, 516, 522), and which in turn are connected via a common data transmission trunk group (e.g., 507''') to each other and to the peripheral controller (510, 520, or 526) of the local interface module (SB1, SB2, SBx), and thus to the central controller, can be linked in each case to one or more such transmit and receive units for the sequential or parallel exchange of information corresponding to data blocks, and with which one or more subscriber stations which can be linked and specifically accessed via the speech path switching network (500) to line transmissions and data terminals. Therefore, every transmit and receive unit can be used to exchange data blocks to and from any terminal station, and also to and from other exchanges.

Figure 6:
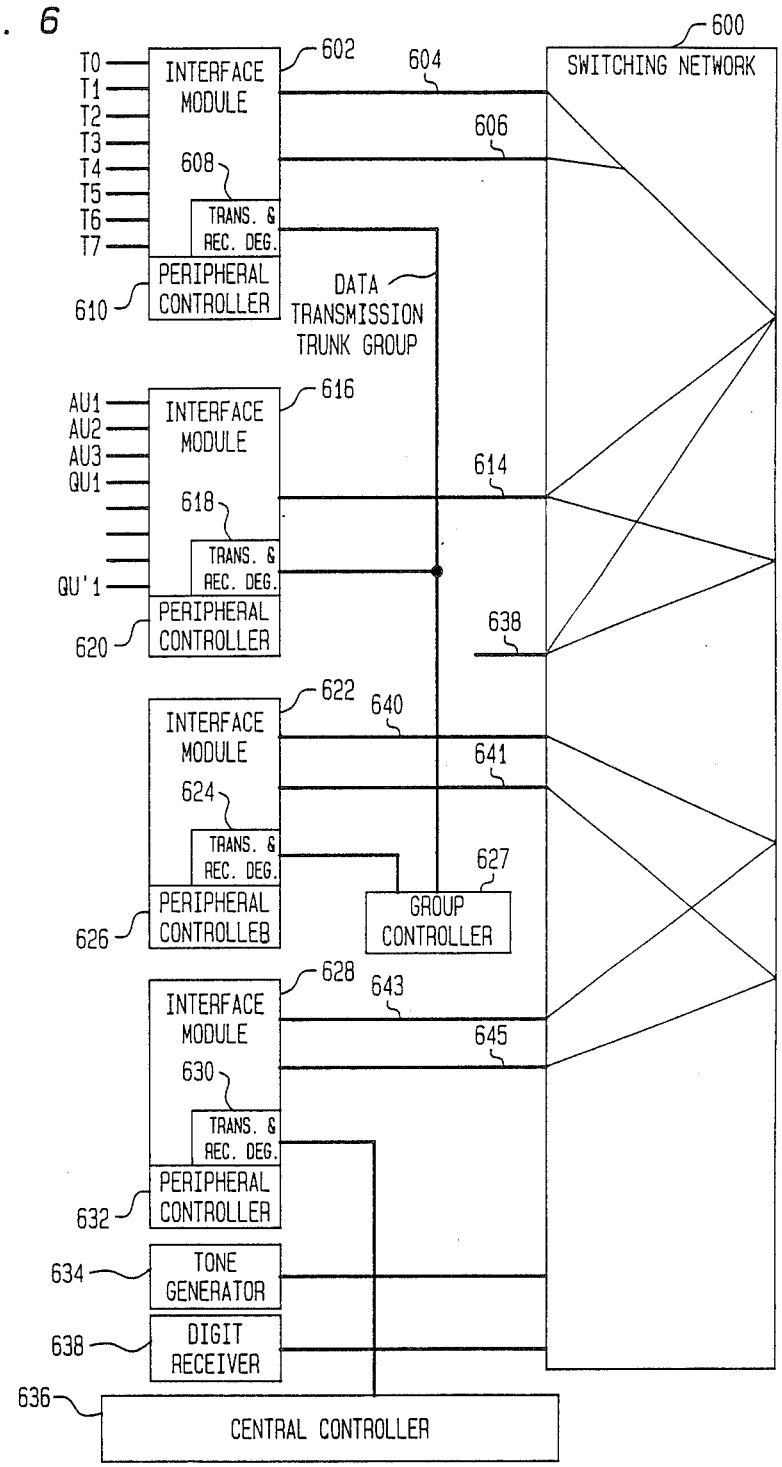
FIG. 6 shows diagrammatically a simplified representation of a digital PBX, based upon which the functions of call setup are explained and in which the exchange of information via the speech path network is possible.

As shown in FIGS. 2 and 6 and as already discussed, the interface module 622, shown as an example in FIG. 6 for one of the several available group controllers not shown, such as the 627 group controllers and the interface modules 628 of the central controller 636, function in the same manner as interface modules SB1 and SB2 for subscriber lines and/or trunk groups, with the difference however, that they are assigned to only one group controller each or to the central controller in order to optimize the possibility of access. However, when the load of interface modules 622 and 616 for controllers permits, a full or limited number of subscriber lines and/or trunk transmissions to the interface modules, such as 622 and 628, can be permitted. If no connections for subscriber lines and trunks are seized, the functions of corresponding portions of interface modules 602 and 616, such as interface circuit 202 for example, are deleted.

Therefore, a universal and integrable interface module can be used in place of data transmission trunk groups not only for exchanging the information of subscriber stations and trunks, but also for the exchange of information and commands between the various controllers via the speech path switching network. This also standardizes the internal exchange of data between controllers and the exchange of data to distant external controllers.

As explained in the preceding pages, the group controllers of the local exchange can be interconnected with each other, with the central controller, and with controllers of other exchanges for the exchange of data via the speech path switching network.

The L-logic mentioned in the preceding pages is to a "last-look logic", which addresses the indication points provided in the system and interrogates their status. In existing systems these indication points are interrogated using a specific sampling frequency. In the case of different sampling frequencies, different logic circuits of this tupe are then required. In the configuration of this invention the sampling frequency is to be adapted in a simple manner to the possible noise frequencies of the indications in order to perform a uniform and reliable evalution of the status changes detected at the indication points. The different indication points are found at different locations, such as in the circuits assigned to the subscriber lines or trunks in which the seizing element, the busy state, or also a special function, such as the pressing of a special key or a special signal, is detected. Since, for example, mechanical contacts such as a hook switch contact can be used in the subscriber loop, noise pulses can occur due to the contact vibration which results in a rapid consecutive detection of loop openings and loop closings, but which do not result in a clear evaluation in the corresponding assigned peripheral controller or in the central controller. For this purpose, the timing equipment 204 is assigned a special memory CCR which is used to set the PCM system. In this memory information is to be established concerning the sampling frequency for the status interrogation functions and the instances for the data change for the data transmission lines. Therefore, for example, up to nine different sampling frequencies can be selected using three consecutive bits.

By means of the set values, such as with these three bits, the following sampling frequencies can be set in the timer elements, 2, 4, 8, 16, and 125 microseconds. In the additional memory locations of this CCR memory, additional data concerning the change of data to the PCM data transmission trunk group, for example, can then be flagged. Also, the data identifying the corresponding time slots can be stored.

Two additional memories are provided in the LL-logic in FIG. 2. In the first status memory LLS, 8 different bits can be stored to identify the last status determined. A definite change in at least one bit in the signaling bit corresponds to a change. In the second memory, up to 8 bits can be written in to control the selective disconnection of the change detector. A change in the signaling bit of memory LLD identifies the fact that no definitely identifiable event has been reported to the peripheral controller. This means that a new evaluation is required during the next sampling. Each indication point is allocated a specific sampling frequency with which the code bits of the indication point can be interrogated. Therefore, the time interval for the repeated addressing of an indication point can be determined by the peripheral controller 110 (or e.g. 610) or the central controller.

Status is interrogated using the LL-logic 214 with the assistance of the status memory LLS, in which a specific number of serially interrogated status results in accordance with the assignment to the indication points are stored. When determining the results of interference, such as in the absence of a definite detection, the LL-logic 214 will not issue an evaluation result by means of additional evaluation resources until after a specific number of repeated accessings of the indication point.

As a rule, a definite result is not obtained until after the equalization of interference. This means that, for a final status change in comparison to the original status flag, the series of consecutive changes as a consequence of the interference, the final evaluation is output. This final result can then be evaluated by the peripheral controller 110 (or e.g. 610) MP. This also means that the evaluation resources of the LL-logic do not issue the evaluation result until after at least two equivalent status results.

There has thus been shown and described a novel method for a switching configuration for a telephone system, in particular a PBX system with subscriber lines, trunk groups and interface modules which fulfills all the objects and advantages sought. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. A switching configuration for a telecommunications system, with subscriber lines and trunk groups, in which respective groups and combined subscriber line/trunk groups are each connected via a common interface module for such groups, both to a speech path switching network and, via a data transmission trunk group, to a central controller provided to establish paths for seized incoming and outgoing subscriber lines and trunks, and in which information is transmitted via the speech path switching network using pulse code modulation, information being transmitted via said data transmission trunk group in a message format using a variable data length, and wherein an interface circuit is assigned to each interface module for the purpose of transmitting information to or receiving information from the subscriber lines and/or trunk circuits, buffering this speech and signal data, and for status monitoring, said switching configuration comprising:

an internal data transmission trunk group and a peripheral controller assigned to the interface module connected to the interface circuit, the speech path switching network and the data transmission trunk group via said internal data transmission trunk group such that the transmission of speech and signal information is based upon control commands of said central controller and said peripheral controller; timer and control switching means assigned to said interface module and being coupled to said internal data transmission trunk group for transmitting and receiving speech information in pulse-code form;

a transmitting and receiving device assigned to said data transmission trunk group and being adapted to receive and transmit information between said central controller and said peripheral controller using a message format with variable data length, said transmitting and receiving device being further assigned to said interface module, and being coupled to said internal data transmission trunk group; and a memory linked to said internal data transmission trunk group, being capable of receiving information in a message format with variable data length and being assigned to said interface module, for buffering said information and sending it to said transmitting and receiving device based upon said peripheral controller, said information being made available based upon said timer and control switching equipment assigned to said interface module for one of (a) transmitting signals via the speech path switching network in pulse-coded form and (b) converting pulse-coded signals received via said speech path switching network.

2. The switching configuration of claim 1, wherein said telecommunications system is a private automatic branch exchange.

3. The switching configuration of claim 2, wherein said transmitting and receiving device is coupled to each of said interface module, said peripheral controller, and to said internal data transmission trunk group of the interface module via a special common data transmission trunk group.

4. Switching configuration of claim 3, wherein at least one data terminal can be linked to said special common data transmission trunk group for the exchange of information via said speech path switching network.

5. The switching configuration of claim 3, wherein said peripheral controller and said special common data transmission trunk group are connected to said internal data transmission trunk group via corresponding peripheral interface circuits.

6. The switching configuration of claim 4, wherein said peripheral controller and said special common data transmission trunk group are connected to said internal data transmission trunk group via corresponding peripheral interface circuits.

* * * * *